United States Patent
Whytock et al.

(10) Patent No.: US 10,120,698 B2
(45) Date of Patent: Nov. 6, 2018

(54) OPERATING SYSTEM (OS) INDEPENDENT PERIPHERAL CONTROL

(71) Applicant: NCR Corporation, Duluth, GA (US)

(72) Inventors: Alexander William Whytock, Perthshire (GB); Graeme Mitchell, Dundee (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/471,566

(22) Filed: Mar. 28, 2017

(65) Prior Publication Data
US 2018/0285124 A1    Oct. 4, 2018

(51) Int. Cl.
*G06F 9/44* (2018.01)
*G06F 9/54* (2006.01)
*G06F 9/455* (2018.01)
*G06F 9/4401* (2018.01)

(52) U.S. Cl.
CPC .......... *G06F 9/4411* (2013.01); *G06F 9/4406* (2013.01); *G06F 9/45558* (2013.01); *G06F 9/54* (2013.01); *G06F 2009/45579* (2013.01)

(58) Field of Classification Search
CPC .. G06F 9/4411; G06F 9/4406; G06F 9/45558; G06F 9/54; G06F 2009/45579
See application file for complete search history.

(56) References Cited

U.S. PATENT DOCUMENTS

| | | | | |
|---|---|---|---|---|
| 6,327,613 | B1* | 12/2001 | Goshey | G06F 9/468 |
| | | | | 707/999.008 |
| 9,098,362 | B1* | 8/2015 | Cathro | G06F 9/546 |
| 2006/0197971 | A1* | 9/2006 | Simpson | G06F 3/1207 |
| | | | | 358/1.14 |
| 2012/0005691 | A1* | 1/2012 | Wong | G06F 9/541 |
| | | | | 719/319 |
| 2014/0068317 | A1* | 3/2014 | Kanigicherla | G06F 9/5011 |
| | | | | 714/2 |
| 2014/0089538 | A1* | 3/2014 | Bachrany | G06F 3/00 |
| | | | | 710/37 |
| 2015/0248359 | A1* | 9/2015 | Monaghan | G06F 9/54 |
| | | | | 719/321 |
| 2015/0254153 | A1* | 9/2015 | Liao | G06F 11/3089 |
| | | | | 710/18 |
| 2015/0347157 | A1* | 12/2015 | Cathro | G06F 9/44505 |
| | | | | 719/327 |

\* cited by examiner

*Primary Examiner* — Glenn A. Auve
(74) *Attorney, Agent, or Firm* — Schwegman, Lundberg & Woessner

(57) ABSTRACT

An Operating-System (OS) independent peripheral API is provided to applications processing in an application OS. The API communicates with a peripheral OS that includes device drivers for peripherals. Requests for accessing the peripherals are made through the API of the application OS but access and control of the peripherals are maintained through the device drivers of the peripheral OS.

17 Claims, 5 Drawing Sheets

OPERATING SYSTEM (OS) INDEPENDENT PERIPHERAL CONTROL

BACKGROUND

The existing Automated Teller Machines (ATM) architecture has a tightly coupled relationship between the host Personal Computer (PC) and the attached peripheral devices. Such that, when the host PC software is changed (updated, patched, replaced) substantial retesting and redevelopment is needed to ensure that access to the attached peripheral devices are not impacted. Similarly, when hardware modules are revised or swapped out for new modules, substantial retesting and redevelopment is needed to ensure proper access to the attached peripheral devices.

This can be particularly problematic to ATM vendors because access and confirmed access to peripheral devices are vital, such as a currency dispenser or an encrypted Personal Identification Number (PIN) pad where proper and confirmed access are vital to operation of the ATM. Moreover, the core ATM application includes a variety of security measures and high-availability (HA) coding measures that have been extensively tested and retested and passed through a variety of quality assurance measures; some of which may be required for governmental compliance.

Many ATM vendors wait for long periods of time before updating to current Operating Systems (OSs) because such upgrades require a substantial amount of software engineering to ensure that the core ATM application and the attached peripheral devices continue to operate as expected. In recent years, some OS vendors have forced the switch over to newer OSs by refusing to provide any patches or support for earlier versions of the vendors' OSs. In some cases, the ATM vendors may pay the OS vendor a substantial amount of money to have an OS version maintained until the ATM vendors can successfully migrate to a newer OS version.

The same problems arise when peripheral manufactures upgrade firmware or replace hardware. The ATM vendors are slow to perform the upgrades or replace the hardware and in many cases may forgo the changes altogether if they can sustain such a situation.

In short, the ATM application environment is highly coupled and dependent on both the underlying peripheral hardware and the OS environment.

SUMMARY

In various embodiments, methods and a Self-Service Terminal OS-independent peripheral control are presented.

According to an embodiment, a method for OS-independent peripheral control is presented. Specifically, and in an embodiment, a request is received at a first OS for access to a peripheral that is interfaced to the first OS; the request originated from a second OS. The request is translated into a peripheral driver format and the translated request is provided to the peripheral driver for processing by the peripheral.

DETAILED DESCRIPTION

Figure 1A:
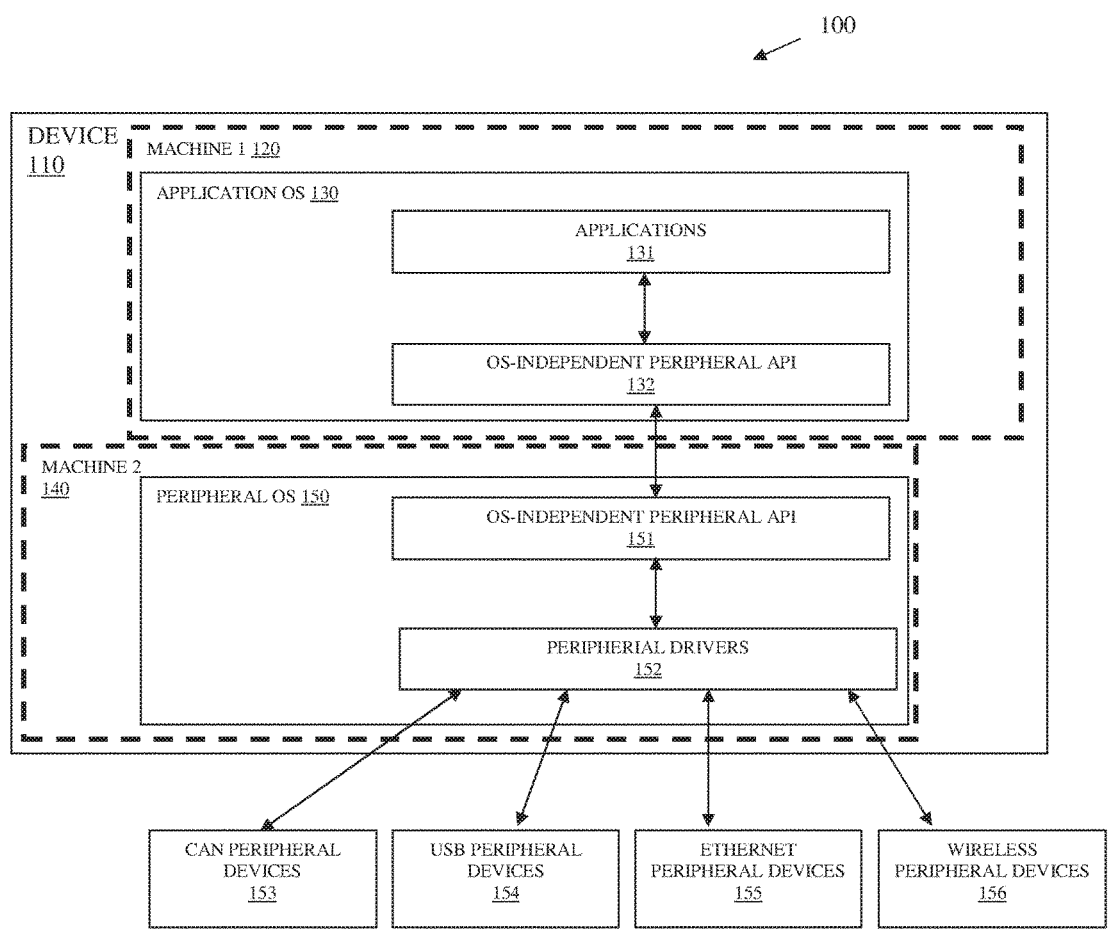
FIG. 1A is a diagram of an OS-independent peripheral control system, according to an example embodiment.

FIG. 1A is a diagram of an OS-independent peripheral control system 100, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of OS-independent peripheral control, presented herein and below.

The system 100 includes a device 110 having a first machine 120 and a second machine 140. The first machine 120 includes an application OS 130; loaded and processing within the application OS 130 are applications 131 and an OS-independent Application Programming Interface (API) 132. The second machine 140 includes a peripheral OS 150; loaded and processing with the peripheral OS 150 is an OS-independent API 151 and peripheral device drivers 152. The peripheral device drivers 150 providing access to a variety of peripheral devices 153-156, such as Controller Area Network (CAN) peripherals 152, Universal Serial Bus (USB) peripherals 153, Ethernet peripherals 154, and wireless peripherals 155 (Bluetooth®, Low Energy (LE) Bluetooth®, Radio Frequency (RF), Wi-Fi, etc.).

The system 100 includes a single device 110 having two separate machines 120 and 140. In an embodiment, the two machines 120 and 140 include their own separate hardware processors, motherboards, memory, etc.; such that there is a hardware and physical separation between the first machine 120 and the second machine 140. In an embodiment, the two machines 120 are both Virtual Machines (VM) 120 and 140; such that there is a logical separation between the two machines 120 and 140 but the two machines share one or more hardware processors, bus connections, memory, etc.

The first machine 120 is modified such that when access to a peripheral device (153-156) is needed the request is intercepted on the OS 130 and processed through the OS-Independent API 132 as one or more peripheral-access commands. The API 132 provides a normalized hardware and OS-independent format for the peripheral-access commands. The API calls are communicated to the API 151. Communication between APIs 132 and 151 can occur in a variety of manners, such as through bus connections, through specified communication ports monitored by both APIs 132 and 151, through a shared memory or storage location, and the like.

The API 151 receives the hardware and OS-independent commands from API 132 and translates those commands into specific device driver commands for specific peripherals. The device drivers 152 then directly communicate peripheral-recognized commands to the appropriate peripherals 153-156. Results from processing the commands by the peripherals 153-156 are passed back from the peripherals 153-156 to the device drivers 152 where the API 151 translates into the hardware and OS-independent communications and provides to API 132. The API 132 then provides to the applications 131.

In this way, the application processing environment (OS 130 of machine 120) is divorced and decoupled from the processing environment of the OS 150 of machine 140 where the peripherals 153-156 are accessed and controlled. This means that upgrades to the OS 130 can occur without effecting or changing operability between the applications 130 and the peripherals 153-156. Additionally, the hardware and OS 150 associated with the peripherals 153-156 is isolated and controlled within machine two 140, such that upgrades can be controlled and tested with less dependencies and divorced and decoupled from the OS 130 and the applications 131.

In an embodiment, the device 110 is a Self-Service Terminal (SST). In an embodiment, the SST is an Automated Teller Machine (ATM). In an embodiment, the SST is a kiosk.

In an embodiment, the device is a Point-Of-Sale (POS) terminal operated by a cashier on behalf of a customer during a checkout process.

In an embodiment, the APIs 132 and 151 are compliant with or a version of the European Committee for Standardization (CEN) eXtensions for Financial Services (XFS) API.

In an embodiment, the APIs 132 and 151 are in an eXtensible Markup Language format (XML).

In an embodiment, the peripherals 153-156 can include one or more of a: display, touchscreen, PIN pad, audio speaker, currency dispenser, disk drive, printer, safe lock, card reader, scanner, keyboard, camera, video camera, USB access port for connecting a peripheral, secure digital (SD) slot for receive an SD memory card, microphone, cash drawer, monitor port (VGA, HDMI, etc.) for connecting a monitor, Bluetooth® transceiver, LE Bluetooth® transceiver, RF reader/transmitter, Wi-Fi transceiver, I2C port, and others.

In an embodiment, the device 110 is an ATM and at least one of the applications 131 is the core ATM application, such that the display (touchscreen or non-touchscreen) is not controlled by the same OS 130 as that which controls the core ATM application. That is, the core ATM application processes within the OS 130 whereas the ATM display and other peripherals are controlled by a separate and different OS 150. In an embodiment of this embodiment, the first machine 120 is a first VM with OS 130 and the second machine 140 is a second VM with OS 150 with the two VMs sharing the underlying motherboard and memory of the device 110.

Figure 1B:
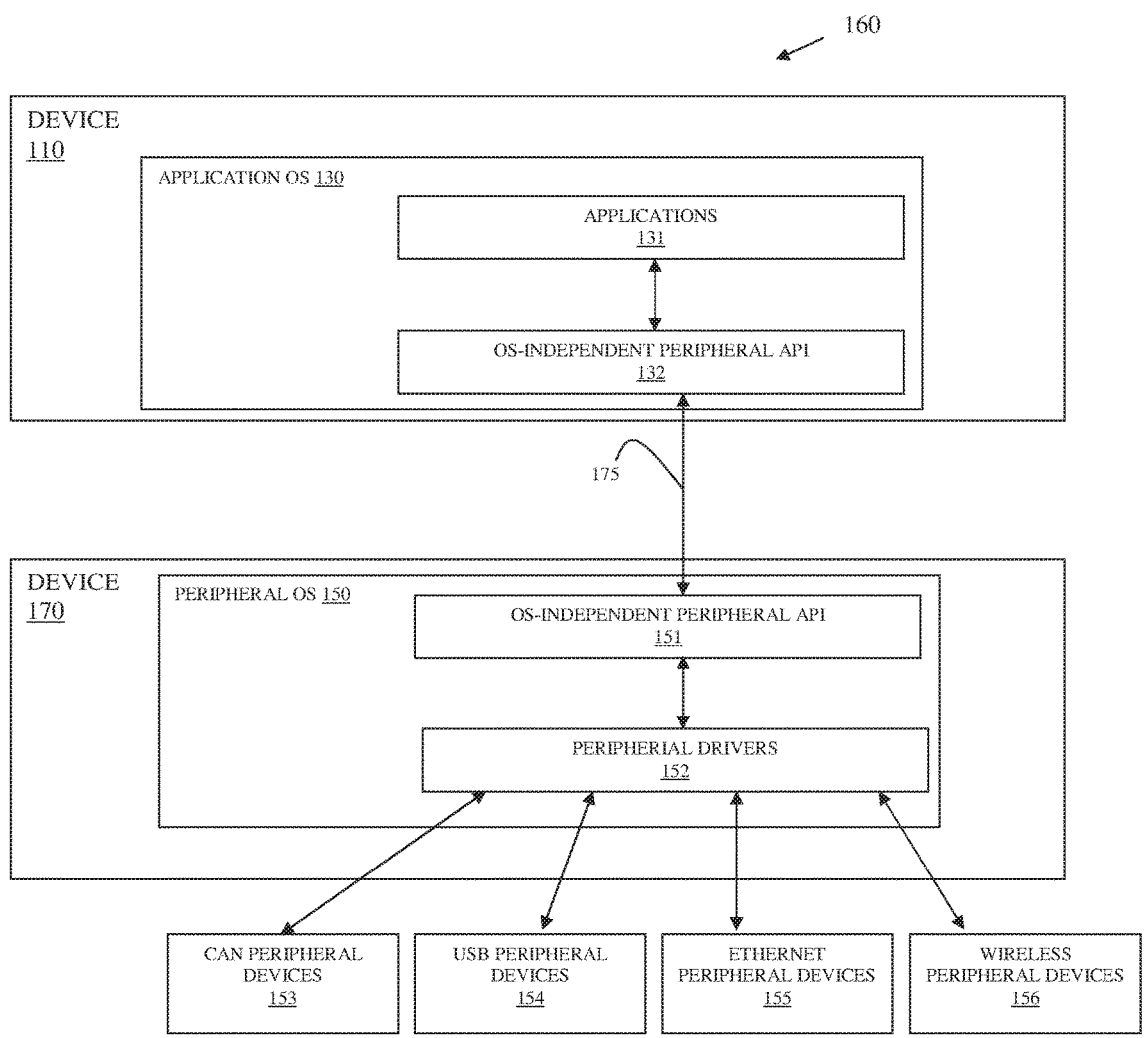
FIG. 1B is a diagram of another OS-independent peripheral control system, according to an example embodiment.

FIG. 1B is a diagram of another OS-independent peripheral control system 160, according to an example embodiment.

The system 160 illustrates a different embodiment from that which was shown with the system 100. Specifically, the OS 130 resides on a hardware device 110 that is physically separated and different from device 170, which includes OS 150. There is a connection 175 made between the two physically separated devices 110 and 170. This connection 175 can be a wired connection such as Ethernet or can be a wireless connection such as Wi-Fi, Bluetooth®, LE Bluetooth®, etc.

So, the two devices 110 and 170 can be connected through Ethernet or USB and integrated under a same housing with two separate motherboards or the two devices 110 and 170 can be geographically separated and connected over a wireless network connection with one another.

In an embodiment, the device 170 is a hardware and software gateway that the device 110 can connect to for access to the peripheral devices 153-156 using API 132. In an embodiment, connection access can be based on Automotive, Network Communication, and/or Server domain controllers.

In an embodiment, the system 160 permits Omni-channel access from a variety of disparate platforms based on the hardware separation and isolation of device 170 from the connecting device 110. The access can be achieved as an integrated device (such as shown in the FIG. 1A) under a common housing or through remote a geographically dispersed network connections (such as in one embodiment of the FIG. 1B).

Logically and/or physically separating devices that process applications from devices that are connected to and control peripherals provides improved: peripheral access and connectivity, platform integration with Omni-channel access to peripherals, security (since security can be isolated and enforced in both environments (application and peripheral), and/or accelerated development (since changes in the OS for the application environment do not impact accessibility and interoperability to the OS controlling the peripherals).

These and other embodiments are now discussed with reference to the FIGS. 2-4.

Figure 2:
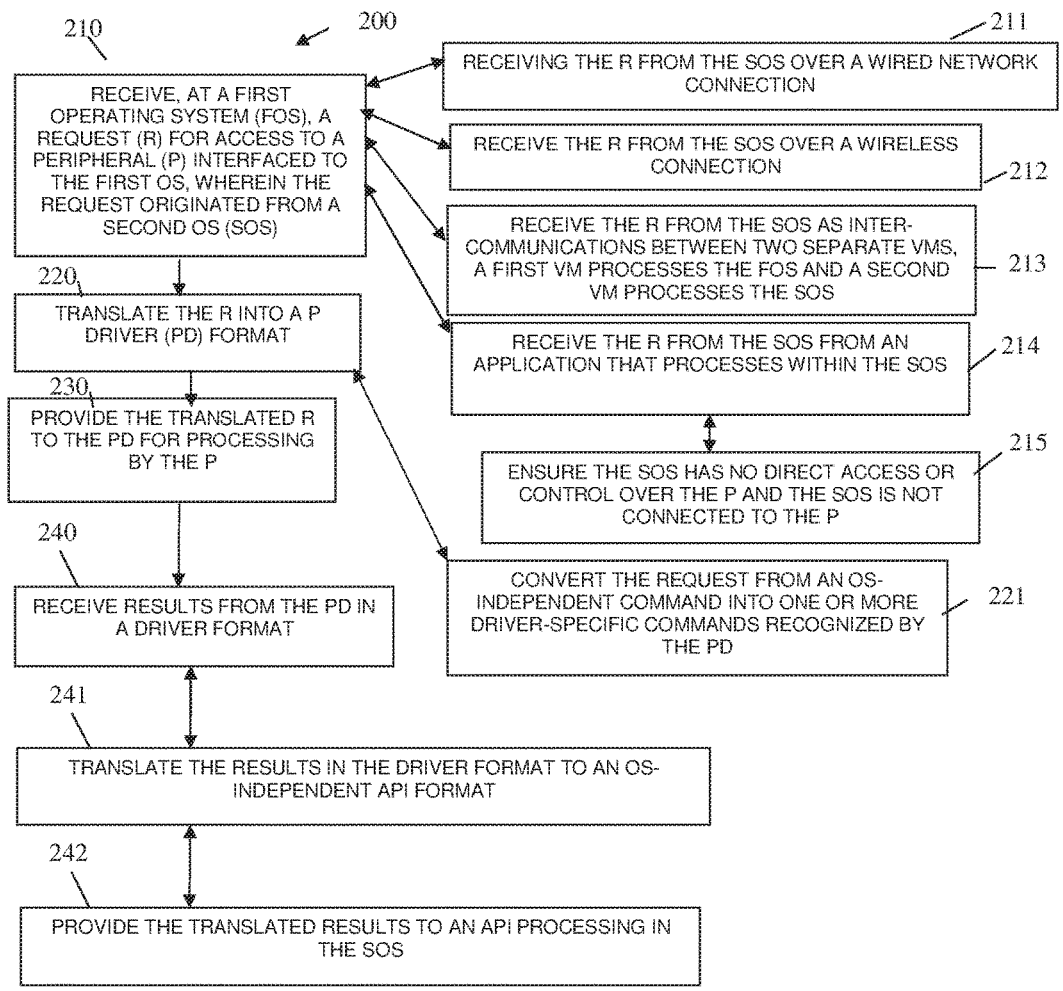
FIG. 2 is a diagram of a method for OS-independent peripheral control, according to an example embodiment.

FIG. 2 is a diagram of a method 200 for OS-independent peripheral control, according to an example embodiment. The software module(s) that implements the method 200 is referred to as a "peripheral controller." The peripheral controller is implemented as executable instructions programmed and residing within memory and/or a non-transitory computer-readable (processor-readable) storage medium and executed by one or more processors of a device. The processor(s) of the device that executes the peripheral controller are specifically configured and programmed to process the SST BIOS credential manager. The peripheral controller has access to one or more network connections during its processing. The network connections can be wired, wireless, or a combination of wired and wireless.

In an embodiment, the device that executes the peripheral controller is the device 110; the peripheral controller is processed by the machine 140, where the machine 140 is a second VM having OS 150 that is separate and different from machine 120 processed as a first VM having OS 130 that processes applications for device 110.

In an embodiment, the device that executes the peripheral controller is device 170, which is a separate physical device from device 110 where applications are processed.

In an embodiment, the peripheral controller is the API 151.

In an embodiment, the peripheral device(s) are any of the peripheral devices 153-156 discussed above with the FIGS. 1A-1B.

In an embodiment, the peripheral controller processes on a SST. In an embodiment, the SST is an ATM. In an embodiment, the SST is a kiosk.

In an embodiment, the peripheral controller processes on a POS terminal operated by a clerk.

At 210, the peripheral controller receives, at a first OS, a request for access to a peripheral that is interfaced to the first OS. The request originates from a second OS.

According to an embodiment, at 211, the peripheral controller receives the request from the second OS over a wired network connection.

In an embodiment, at 212, the peripheral controller receives the request from the second OS over a wireless network connection.

In an embodiment, at 213, the peripheral controller receives the request from the second OS as inter-communications between two VMs. The first VM processes on the first OS and the second VM processes on the second VM.

In an embodiment, at 214, the peripheral controller receives the request from the second OS from an application that processes within the second OS.

In an embodiment of 214 and at 215, the peripheral controller ensures that the second OS has no control and no direct access to the peripheral, which is controlled by the peripheral controller within the first OS. The second OS is not connected to the peripheral.

At 220, the peripheral controller translates the request into a peripheral driver format that is recognized and can be processed by a peripheral driver of the peripheral from the first OS.

In an embodiment, at 221, the peripheral controller converts the request from an OS-independent command into one or more driver-specific commands recognized and capable of being processed by the peripheral driver of the peripheral from the first OS.

At 230, the peripheral controller provides the translated request to the peripheral driver.

According to an embodiment, at 240, the peripheral controller receives results back from the peripheral driver in a peripheral-driver format.

In an embodiment of 240 and at 241, the peripheral controller translates the results from the peripheral-driver format into an OS-independent API format.

In an embodiment of 241 and at 242, the peripheral controller provides the results in the OS-independent API format to an API processing on the second OS.

Figure 3:
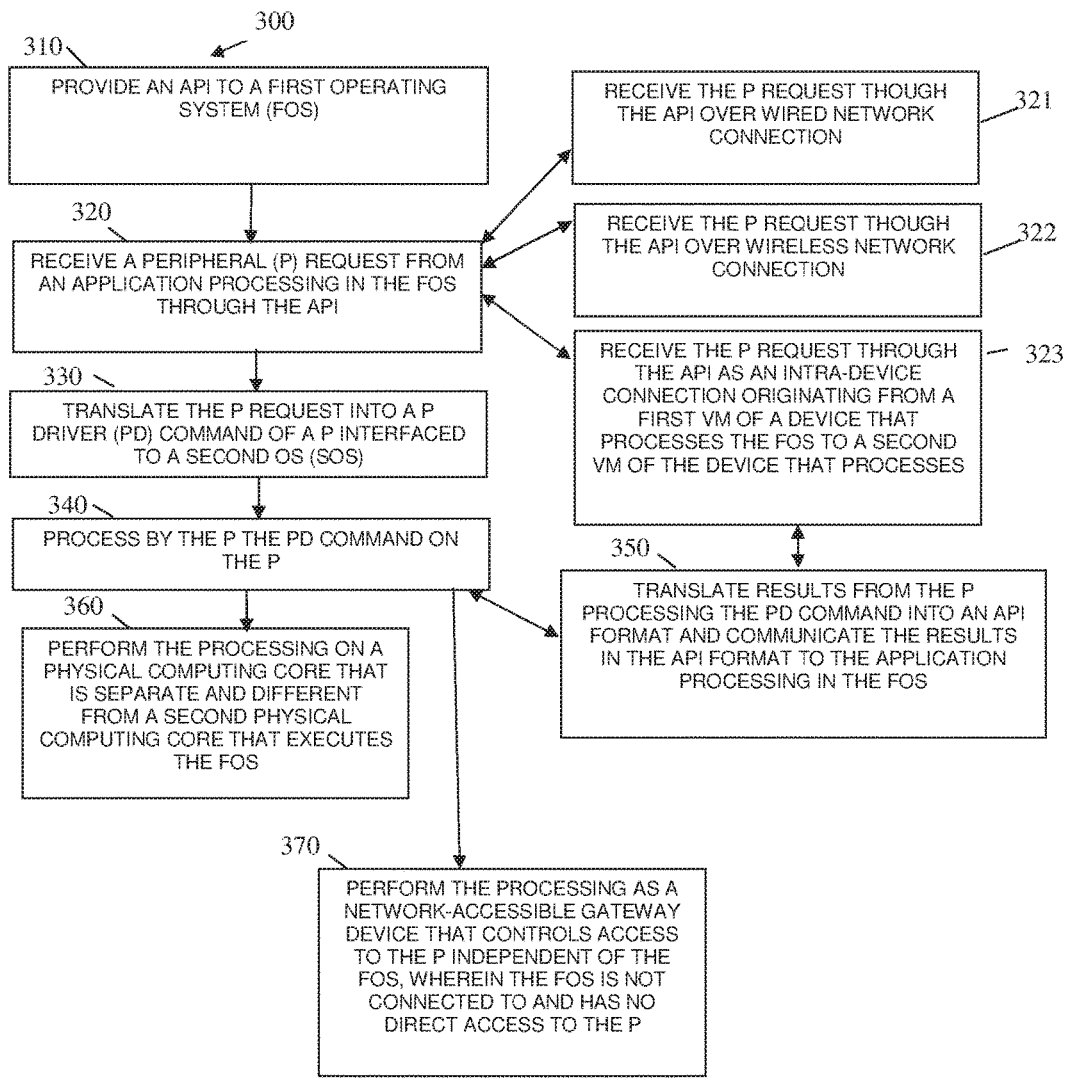
FIG. 3 is a diagram of another method for OS-independent peripheral control, according to an example embodiment.

FIG. 3 is a diagram of another method 300 for OS-independent peripheral control, according to an example embodiment. The software module(s) that implements the method 300 is referred to as a "peripheral manager." The peripheral manager is implemented as executable instructions programmed and residing within memory and/or a non-transitory computer-readable (processor-readable) storage medium and executed by one or more processors of a device. The processors that execute the peripheral manager are specifically configured and programmed to process the peripheral manager. The peripheral manager has access to one or more network connections during its processing. The network connections can be wired, wireless, or a combination of wired and wireless.

In an embodiment, the device that executes the peripheral manager is the device 110; the peripheral manager is processed by the machine 140, where the machine 140 is a second VM having OS 150 that is separate and different from machine 120 processed as a first VM having OS 130 that processes applications for device 110.

In an embodiment, the device that executes the peripheral manager is device 170, which is a separate physical device from device 110 where applications are processed.

In an embodiment, the peripheral manager is the API 151.

In an embodiment, the peripheral device(s) are any of the peripheral devices 153-156 discussed above with the FIGS. 1A-1B.

In an embodiment, the peripheral manager processes on a SST. In an embodiment, the SST is an ATM. In an embodiment, the SST is a kiosk.

In an embodiment, the peripheral manager processes on a POS terminal operated by a clerk.

In an embodiment, the peripheral manager illustrates another and in some ways enhanced perspective of the method 200.

At 310, the peripheral manager provides an API to a first OS. The peripheral manager processing in a second OS.

At 320, the peripheral manager receives a peripheral request from an application processing in the first OS through the API.

In an embodiment, at 321, the peripheral manager receives the request through the API over a wired connection.

In an embodiment, at 322, the peripheral manager receives the request through the API over a wireless connection.

In an embodiment, at 323, the peripheral manager receives the request as an inter-device communication that originates from a first VM processing on the device and executing the first OS. The request received by the peripheral manager processing on a second VM of the device and executing the second OS.

At 330, the peripheral manager translates the peripheral request into a peripheral driver command of a peripheral interfaced to the second OS.

At 340, the peripheral manager processes, by the peripheral, the peripheral driver command.

In an embodiment of 323 and 340, at 350, the peripheral manager translates results returned from the peripheral processing the peripheral command into an API format and communicates the translated results to the application processing on the first OS through the API.

According to an embodiment, at 360, the peripheral manager processes on a first physical computing core (first motherboard) that is physically separate and different from a second physical computing core (second motherboard) that executes the first OS.

In an embodiment, at 370, the peripheral manager processes as a network-accessible gateway device that controls access to the peripheral independent of the first OS (having the application that originated the peripheral request at 320). The first OS is not connected to and has no direct access to the peripheral.

Figure 4:
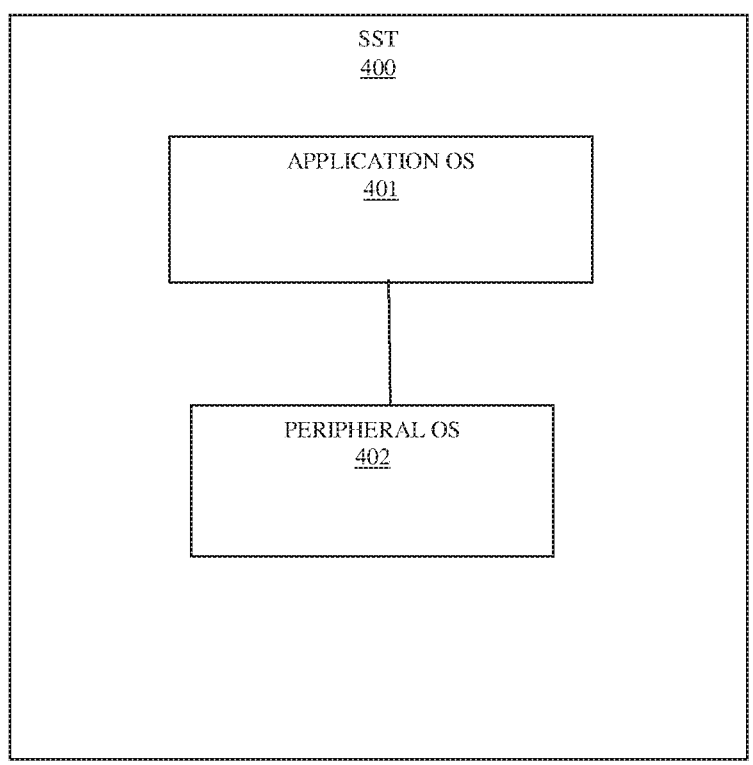
FIG. 4 is a diagram of a Self-Service Terminal (SST), according to an example embodiment.

FIG. 4 is a diagram of a SST 400, according to an example embodiment. The SST 400 includes a variety of hardware components and software components. The software components of the SST 400 are programmed and reside within memory and/or a non-transitory computer-readable medium and execute on one or more processors of the SST 400. The SST 400 may communicate over one or more networks, which can be wired, wireless, or a combination of wired and wireless.

In an embodiment, the SST 400 is the system 100 of the FIG. 1.

In an embodiment, the SST 400 is an ATM.

In an embodiment, the SST 400 is a kiosk.

In an embodiment, the SST 400 is a POS terminal.

In an embodiment, the peripheral(s) discussed with the SST 400 are any of the peripherals 153-156 discussed above with the FIGS. 1A-1B.

In an embodiment, the SST 400 implements all or some combination of the processing discussed above with the FIGS. 1A-1B, and/or 2-3.

The SST 400 includes an application OS 401 and a peripheral OS 402.

In an embodiment, the OS 401 is executed by hardware processors of a first computing core associated with the SST 400 and the OS 402 is executed by different hardware processors of a second computing core associated with the SST 400.

In an embodiment, the OS 401 is processed by a first VM and OS 402 is processed by a second VM. Both VMs are executed by shared hardware processors integrated into a motherboard of the SST 400.

Direct access to any peripherals interfaced or integrated into the SST 400 is controlled by the OS 402.

The application OS 401 is configured to or operable to execute an application processing within the application OS 401 for controlling the SST 400.

The peripheral OS 402 is configured to or operable to control a plurality of peripheral devices coupled to the SST 400 for use by the application.

The application OS 401 is further configured to: i) identify a request for a peripheral device originating from the application and ii) provide the request through an OS-independent API command to the peripheral OS 402.

The peripheral OS 402 is configured to: iii) translate the API command into a peripheral command and iv) process the peripheral command on the peripheral device.

In an embodiment, the SST 400 is an ATM and the peripheral device is connected to the peripheral OS 402 of the ATM and is one of: a display, a touch screen, a currency dispenser, a card reader, a scanner, a speaker, a microphone, a keyboard, a PIN pad, a receipt printer, and a wireless transceiver for wireless communication between the ATM and a wireless-enabled device.

In an embodiment, the application OS is the OS 130.

In an embodiment, the peripheral OS 402 is the OS 150.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, at a first Operating System (OS), a request for access to a peripheral interfaced to the first OS, wherein the request originated from a second OS, wherein receiving the request further includes receiving the request from the second OS as inter-communications between two separate Virtual Machines (VMs), wherein a first VM processes the first OS and a second VM processes the second OS;
translating the request into a peripheral driver format; and
providing the translated request to a peripheral driver for processing by the peripheral.

2. The method of claim 1, wherein receiving further includes receiving the request from the second OS over a wired network connection.

3. The method of claim 1, wherein receiving further includes receiving the request from the second OS over a wireless connection.

4. The method of claim 1, wherein receiving further includes receiving the request from the second OS from an application that processes within the second OS.

5. The method of claim 4, wherein receiving further includes ensuring the second OS has no direct access or control over the peripheral and wherein the second OS is not connected to the peripheral.

6. The method of claim 1, wherein translating further includes converting the request from an OS-independent command into one or more driver-specific commands recognized by the peripheral driver.

7. The method of claim 1 further comprising, receiving results from the peripheral driver in a driver format.

8. The method of claim 7 further comprising, translating the results in the driver format to an OS-independent Application Programming Interface (API) format.

9. The method of claim 8 further comprising, providing the translated results to an API processing in the second OS.

10. A method, comprising:
providing an Application Programming Interface (API) to a first Operating System (OS);
receiving a peripheral request that originates from an application processing in the first OS and receiving the peripheral request through the API, wherein receiving further includes receiving the peripheral request through the API as an intra-device connection originating from a first Virtual Machine (VM) of a device that processes the first OS to a second VM of the device that processes the method;
translating the peripheral request into a peripheral driver command of a peripheral interfaced to a second OS; and
processing by a peripheral driver the peripheral driver command on the peripheral.

11. The method of claim 10, wherein receiving further includes receiving the peripheral request though the API over wired network connection.

12. The method of claim 10, wherein receiving further includes receiving the peripheral request through the API over a wireless network connection.

13. The method of claim 10 further comprising, translating results from the peripheral processing the peripheral driver command into an API format and communicating the results in the API format to the application processing in the first OS.

14. The method of claim 10 further comprising, processing the method on a physical computing core that is separate and different from a second physical computing core that executes the first OS.

15. The method of claim 10 further comprising, processing the method on a network-accessible gateway device that controls access to the peripheral independent of the first OS, wherein the first OS is not connected to and has no direct access to the peripheral.

16. A Self-Service Terminal (SST), comprising:
a first Operating System (OS) operable to execute an application for controlling the SST; and
a second OS operable to control a plurality of peripheral devices coupled to the SST and available for use by the application;
wherein the first OS is configured to: i) identify a request for a peripheral device originating from the application and ii) provide the request through an OS-independent Application Programming Interface (API) command to the second OS, and wherein the second OS is configured to: iii) translate the API command into a peripheral command and iv) process the peripheral command on the peripheral device
wherein the SST is an Automated Teller Machine (ATM).

17. The SST of claim 16, wherein the peripheral device is connected to the second OS of the ATM and is one of:
a display, a touch screen, a currency dispenser, a card reader, a scanner, a speaker, a microphone, a keyboard, a Personal Identification Number (PIN) pad, a receipt printer, and a wireless transceiver for wireless communication between the ATM and a wireless-enabled device.

* * * * *